United States Patent
Nakajima

(10) Patent No.: US 7,725,743 B2
(45) Date of Patent: May 25, 2010

(54) MOBILE DEVICE WITH INDEX CREATION FUNCTION, METHOD CONTROLLING THE SAME, AND COMPUTER PROGRAM FOR EXECUTING THE METHOD

(75) Inventor: Yasumasa Nakajima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 611 days.

(21) Appl. No.: 11/787,849

(22) Filed: Apr. 18, 2007

(65) Prior Publication Data

US 2007/0283180 A1 Dec. 6, 2007

(30) Foreign Application Priority Data

Apr. 18, 2006 (JP) ............................. 2006-114584

(51) Int. Cl.
*G06F 17/30* (2006.01)
*G06F 15/16* (2006.01)

(52) U.S. Cl. ...................... 713/300; 713/310; 713/321; 713/322; 713/323; 713/324; 713/330; 713/340; 707/3; 707/4

(58) Field of Classification Search ................. 713/300, 713/310, 320–324, 330, 340; 707/3, 4
See application file for complete search history.

(56) References Cited

U.S. PATENT DOCUMENTS

| | | | |
|---|---|---|---|
| 6,177,892 B1 * | 1/2001 | Ko | 341/106 |
| 6,594,740 B1 | 7/2003 | Fukuda | |
| 6,903,778 B1 | 6/2005 | Kaku | |
| 7,143,086 B2 * | 11/2006 | Miyamoto et al. | 707/3 |
| 2002/0196807 A1 * | 12/2002 | Miura et al. | 370/465 |

FOREIGN PATENT DOCUMENTS

| | | |
|---|---|---|
| JP | 11-242873 A | 9/1999 |
| JP | 2000-125236 A | 4/2000 |
| JP | 2004-303250 | 10/2004 |
| JP | 2004-364117 A | 12/2004 |
| JP | 2005-062537 A | 3/2005 |

* cited by examiner

*Primary Examiner*—Abdelmoniem Elamin
(74) *Attorney, Agent, or Firm*—Nutter McClennen & Fish LLP; John J. Penny, Jr.

(57) ABSTRACT

A mobile device includes a file storage portion, a file reading portion, an index creating portion, an electric storage portion, an electric energy input/output portion, and an index creation determining portion. The file storage portion stores files. The file reading portion is capable of reading the contents of the files stored in the file storage portion. The index creating portion controls the file reading portion so as to read the contents of the files stored in the file storage portion and creates index data that can be used for searching of the contents of the files read by the file reading portion. The electric storage portion is capable of being charged/discharged. The electric energy input/output portion is capable of acquiring electric energy input from the electric storage portion and an external power source, and is capable of outputting electric energy to the electric storage portion, the file reading portion, and the index creating portion. The index creation determining portion permits the index creating portion to create the index data when an index creation condition that the electric energy input/output portion can acquire electric energy input from the external power source is satisfied, and does not permit the index creating portion to create the index data when the index creation condition is not satisfied.

8 Claims, 4 Drawing Sheets

MOBILE DEVICE WITH INDEX CREATION FUNCTION, METHOD CONTROLLING THE SAME, AND COMPUTER PROGRAM FOR EXECUTING THE METHOD

BACKGROUND

The entire disclosure of Japanese Patent Application No. 2006-114584, filed Apr. 18, 2006 is expressly incorporated by reference herein.

1. Technical Field

The present invention relates to a mobile device with an index creation function, a method of controlling the mobile device, and a computer program for executing the method.

2. Related Art

It has been known that a computer creates index data that can be used for searching. For example, in a computer disclosed in JP-A-2004-303250, an indexer identifies and acquires one or plurality of selected words from files that are stored in the computer or on a network and then stores or maps the words in records within the index data.

It is conceivable that index data that can be used for searching are created in a mobile device with an index creation function, which operates on electric energy supplied from an electric storage device, such as a battery, provided thereon. However, when an index creating process is executed while the mobile device is operating on electric energy supplied from the electric storage device, electric energy needs the electric energy for executing that process. This additionally reduces the amount of residual capacity in the electric storage device, resulting in a reduced operable time being left for the mobile device with an index creation function.

SUMMARY

An advantage of some aspects of the invention is that a mobile device with an index creation function, which creates index data without reducing operable time in an electric storage device, a method of controlling the mobile device and a computer program for executing the method are provided.

A mobile device with an index creation function, a method of controlling the mobile device and a computer program for executing the method according to some aspects of the invention are provided in the following manner.

A first aspect of the invention provides a mobile device with an index creation function. The mobile device includes a file storage portion, a file reading portion, an index creating portion, an electric storage portion, an electric energy input/output portion, and an index creation determining portion. The file storage portion stores files. The file reading portion is capable of reading the contents of the files stored in the file storage portion. The index creating portion controls the file reading portion so as to read the contents of the files stored in the file storage portion and creates index data that can be used for searching of the contents of the files read by the file reading portion. The electric storage portion is capable of being charged/discharged. The electric energy input/output portion is capable of acquiring electric energy input from the electric storage portion and an external power source, and is capable of outputting electric energy to the electric storage portion, the file reading portion, and the index creating portion. The index creation determining portion permits the index creating portion to create the index data when an index creation condition that the electric energy input/output portion can acquire electric energy input from the external power source is satisfied, and does not permit the index creating portion to create the index data when the index creation condition is not satisfied.

The mobile device with an index creation function permits the index creating portion to create the index data when an index creation condition that the electric energy input/output portion can acquire electric energy input from the external power source is satisfied, and does not permit the index creating portion to create the index data when the index creation condition is not satisfied. In this manner, when electric energy can be input from the external power source, index creation may be executed using electric energy supplied from the external power source without using electric energy stored in the electric storage device. Thus, the index data may be created with no decrease in operable time when the mobile device operates on the electric storage portion. Note that, the case where the index creating portion creates the index data includes the case where the created index data are updated, other than the case where new index data are created.

The mobile device with an index creation function according to the first aspect of the invention may be provided with a keyword input portion with which a keyword is input, an index search portion that searches the index data created by the index creating portion on the basis of the keyword input with the keyword input portion, and a search result output portion that outputs the results of search executed by the index search portion. By so doing, the index data may be searched on the basis of the keyword, and the results may be output. Note that, the keyword means a search key that is specified by characters, figures, symbols, or the like.

In the mobile device with an index creation function according to the first aspect of the invention, the index creating portion may be configured to sort the index data so as to create groups, each having common specific contents contained in the index data, with an increase in the number of index data by a predetermined number. Even when sorting of index data has been executed so as to create groups each having common specific contents contained in the index data, sorting is executed again because the order of index data may be disorganized when the number of index data is increased by a predetermined number afterward. By so doing, the order of index data disorganized may be regularly corrected, so that searching of index data may be smoothly executed.

In the mobile device with an index creation function according to the first aspect of the invention, the index creation determining portion may be configured, in the case where the electric energy input/output portion can acquire electric energy input from the external power source, to permit the index creating portion to create the index data when a power switch is off and the electric storage portion has a residual capacity outside a predetermined low residual capacity range, and not to permit the index creating portion to create the index data when the power switch is off and the electric storage portion has a residual capacity within the predetermined low residual capacity range. Because, when electric energy supplied from the external power source can be input and the power switch is off, a user mostly allows the mobile device to acquire electric energy input from the external power source in order to charge the electric storage portion, it coincides with the user needs to give priority to charging the electric storage portion over index creation when the electric storage portion has a residual capacity within the low residual capacity range.

In the mobile device with an index creation function according to the first aspect of the invention, the index creation determining portion may be configured, in the case where the electric energy input/output portion can acquire electric energy input from the external power source, to permit the index creating portion to create the index data when the power switch is on and the mobile device is in an idle state, and not to permit the index creating portion to create the index data when the power switch is on and the mobile device is not in an idle state. Because a user is manipulating the mobile device when it is not in an idle state even in the case where electric energy can be input from the external power source and when the power switch is on, index creation is not permitted so as not to impede the manipulation of the user.

In the mobile device with an index creation function according to the first aspect of the invention, the file storage portion may be a hard disk, and the file reading portion may be a hard disk drive. Because the hard disk drive consumes a large amount of electric energy and also consumes a large amount of electric energy during index creation, it is particularly significant to apply the first aspect of the invention.

A second aspect of the invention provides a method of controlling a mobile device with an index creation function. The mobile device includes a file storage portion, a file reading portion, an index creating portion, an electric storage portion, and an electric energy input/output portion. The file storage portion stores files. The file reading portion is capable of reading the contents of the files stored in the file storage portion. The index creating portion controls the file reading portion so as to read the contents of the files stored in the file storage portion and creates index data that can be used for searching of the contents of the files read by the file reading portion. The electric storage portion is capable of being charged/discharged. The electric energy input/output portion is capable of acquiring electric energy input from the electric storage portion and an external power source, and is capable of outputting electric energy to the electric storage portion, the file reading portion, and the index creating portion. The method includes permitting the index creating portion to create the index data when an index creation condition that the electric energy input/output portion can acquire electric energy input from the external power source is satisfied, and not permitting the index creating portion to create the index data when the index creation condition is not satisfied.

The method of controlling the mobile device with an index creation function permits the index creating portion to create the index data when an index creation condition that the electric energy input/output portion can acquire electric energy input from the external power source is satisfied, and does not permit the index creating portion to create the index data when the index creation condition is not satisfied. In this manner, when electric energy can be input from the external power source, index creation may be executed using electric energy supplied from the external power source without using electric energy stored in the electric storage device. Thus, the index data may be created with no decrease in operable time when the mobile device operates on the electric storage portion. Note that additional steps may be added so as to implement operations and/or functions presented by components of the above-described mobile device with an index creation function.

A third aspect of the invention provides a computer readable storage medium storing a computer program that is executable on one or plurality of computers, the computer program including instructions for executing the steps of the method according to the second aspect of the invention. The computer program may be recorded on a computer readable recording medium, such as a hard disk, a read-only memory, a floppy disk, a compact disk, and a digital versatile disk, and may be distributed from one computer to another computer through a transmission medium (which is a communication network, such as internet and LAN). Other than that, the computer program may be transferred in any manner possible. When the computer program is executed on one computer or executed on a plurality of distributed computers, the steps of the above-described method are performed, so that the same advantageous effects as in the case of the above-described method may be attained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
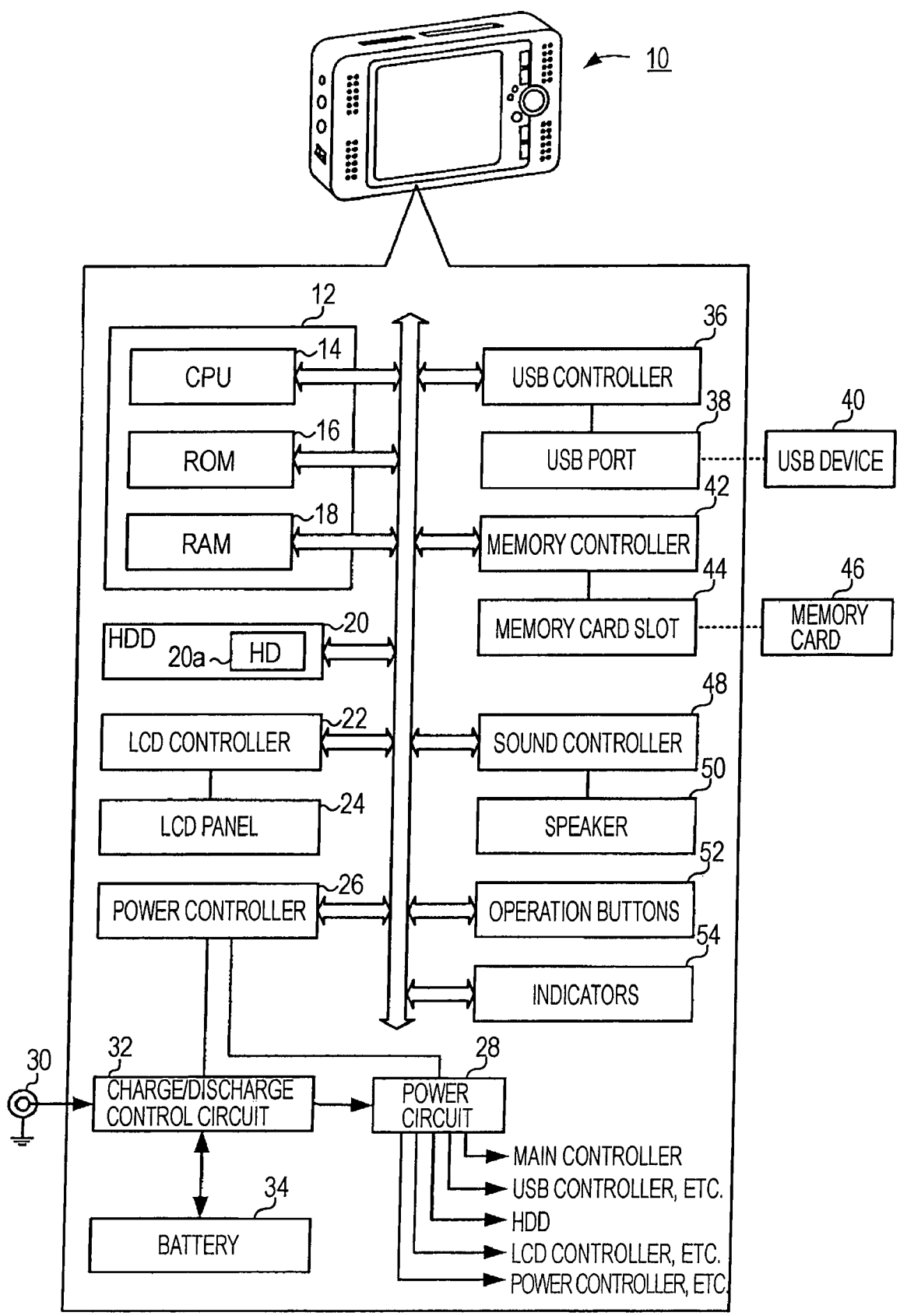
FIG. 1 is a block diagram that illustrates a schematic configuration of a multimedia storage viewer according to an exemplary embodiment of the invention.

An exemplary embodiment of the invention will be now be described with reference to the accompanying drawings. FIG. 1 is a block diagram that illustrates a schematic configuration of a multimedia storage viewer 10 which is one exemplary embodiment of a mobile device with an index creation function according to the invention. The multimedia storage viewer 10 according to the exemplary embodiment includes a USB controller 36, a memory card controller 42, a hard disk drive 20, an LCD controller 22, a sound controller 48, operation buttons 52, indicators 54, a power circuit 28, a charge/discharge control circuit 32, a power controller 26, and a main controller 12. The USB controller 36 inputs and outputs data from and to a USB device 40 that is connected to a USB port 38. The memory controller 42 inputs data from and outputs data to a memory card 46 that is connected to a memory card slot 44. The hard disk drive 20 stores data in a hard disk 20a. The LCD controller 22 controls an LCD panel 24 to display images or moving images according to image data or moving image data. The sound controller 48 controls a speaker 50 to produce a sound. Instructions of a user are input by the operation buttons 52. The indicators 54 indicate that file access or charging is being performed. The power circuit 28 supplies electric energy to the whole multimedia storage viewer 10. The charge/discharge control circuit 32 is capable of charging a battery 34 with electric energy supplied from an external power source 30 and is capable of supplying the power circuit 28 with electric energy supplied from the external power source 30 and/or the battery 34. The power controller 26 controls the power circuit 28 and the charge/discharge control circuit 32. The main controller 12 governs the control of the whole multimedia storage viewer 10. The USB controller 36, the memory controller 42, the hard disk drive 20, the LCD controller 22, the sound controller 48, the operation buttons 52, the indicators 54, the power controller 26 and the main controller 12 are configured to be able to transfer various control signals and data through a bus.

The USB controller 36 inputs data from and outputs data to the USB device 40 that is connected to the USB port 38. The USB controller 36, when an external hard disk drive is, for example, connected to the USB port 38, reads a folder or a file stored in the hard disk of the external hard disk drive and then sends it to the main controller 12, or inputs instructions from the main controller 12 and then writes data onto the hard disk of the external hard disk drive in accordance with the instructions.

The memory controller 42 inputs data from and outputs data to the memory card 46 that is connected to the memory card slot 44. The memory controller 42, when the memory card 46 is connected to the memory card slot 44, reads a folder or a file stored in the memory card 46 and then sends it to the main controller 12, or inputs instructions from the main controller 12 and then writes data onto the memory card 46 in accordance with the instructions.

The hard disk drive 20 is provided therein with the hard disk 20a as a recording medium. The hard disk drive 20, in accordance with instructions from the main controller 12, stores data input by the USB controller 36, the memory controller 42, or the like, in the hard disk 20a, or reads data stored in the hard disk 20a and then sends it to the main controller 12. For example, audio and visual files, such as image files, moving image files, music files, (hereinafter, they are called AV files) are stored in the hard disk 20a. Each of the AV files contains header information. For example, each image file contains information such as model name of an image input device, date and time of image data generation, file type of an image, and number of pixels.

The LCD controller 22 receives image data or moving image data that are to be displayed on the LCD panel 24, and controls the LCD panel 24 so as to display an image or a moving image on the LCD panel 24 according to the image data received or the moving image data received. The sound controller 48 receives music data and controls the speaker 50 to produce a sound according to the music data received.

Figure 2:
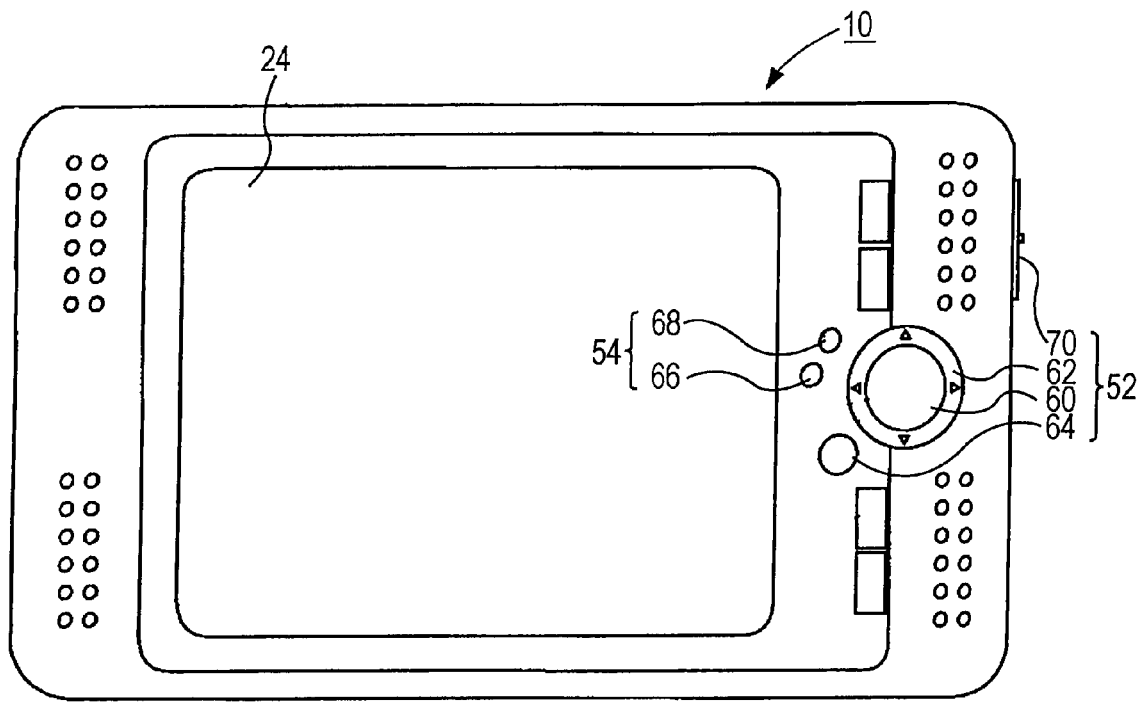
FIG. 2 is a front view of the multimedia storage viewer according to the exemplary embodiment of the invention.

The operation buttons 52, as shown in FIG. 2, include a selection button 62 that is used for selecting an AV file by moving a cursor around, an OK button 60 that is pressed to determine the selection or pressed when starting execution of various processes, a cancel button 64 that is used for canceling a selection, and a power switch 70 that is used for turning on or off the multimedia storage viewer 10. For example, when an image file needs to be displayed on the LCD panel 24, a user selects an image that needs to be displayed from among a plurality of thumbnail images displayed on the LCD panel 24 by manipulating the selection button 62, and then press the OK button 60 to determine it. Then, the selected image is displayed on the LCD panel 24.

The indicators 54 include an access lamp 66 that indicates a state during accessing to the hard disk 20a of the hard disk drive 20, a charge lamp 68 that indicates a state during charging the battery 34, and the like.

The power circuit 28 is used for supplying electric energy to the components of the multi storage viewer 10. The power circuit 28 is configured to supply electric energy to the components of the multimedia storage viewer 10 at an appropriate timing in accordance with instructions from the power controller 26.

The charge/discharge control circuit 32 charges the battery 34, and acquires electric energy input from the external power source 30 or the battery 34 to supply the power circuit 28 with electric energy. The charge/discharge control circuit 32, when electric energy is supplied from the external power source 30, charges the battery 34 and supplies the power circuit 28 with electric energy in accordance with instructions from the power controller 26. On the other hand, when electric energy is not supplied from the external power source 30, the charge/discharge control circuit 32 acquires eclectic energy input from the battery 34 and then supplies the power circuit 28 with electric energy in accordance with instructions from the power controller 26.

The power controller 26 controls the power circuit 28 and the charge/discharge control circuit 32. The power controller 26 monitors the amount of charge stored in the battery 34. The power controller 26, when the battery 34 is not a full charge and electric energy is supplied from the outside, controls the charge/discharge control circuit 32 so as to charge the battery 34 and controls the charge/discharge control circuit 32 so as to supply the power circuit 28 with electric energy input from the external power source 30. When electric energy is not supplied from the external power source 30, the power controller 26 controls the charge/discharge control circuit 32 so as to supply the power circuit 28 with electric energy input from the battery 34. When a user inputs a power-on command, the power controller 26 controls the charge/discharge control circuit 32 and the power circuit 28 so as to supply electric energy to the main controller 12, the hard disk drive 20, the LCD controller 22, the LCD panel 24, the USB controller 36, the memory controller 42, and the sound controller 48. When a user inputs a power-off command, the power controller 26 controls the charge/discharge control circuit 32 and the power circuit 28 so as to stop supplying electric energy to these devices. In addition, when index data are created, the power controller 26 controls the charge/discharge control circuit 32 and the power circuit 28 so as to supply electric energy to the main controller 12 and the hard disk drive 20. Furthermore, the power controller 26 sets a permission flag Fin that indicates whether or not the main controller 12 is permitted to create the index data, which will be described later. The permission flag Fin is a flag that is set when the power controller 26 executes a permission flag setting routine, which will be described later. The permission flag Fin is set for '1' when the main controller 12 is permitted to execute a process to create index data and is reset for '0' when the main controller 12 is not permitted to execute a process to create index data.

The main controller 12 is a microcomputer having a central processing unit (CPU) 14 as a main component and is provided with a read-only memory (ROM) 16 that stores a computer program, or the like, and a random access memory (RAM) 18 that temporarily stores data. The ROM 16 stores a record file creating program that is executed to create the index data based on AV files stored in the hard disk 20a of the hard disk drive 20.

Figure 3:
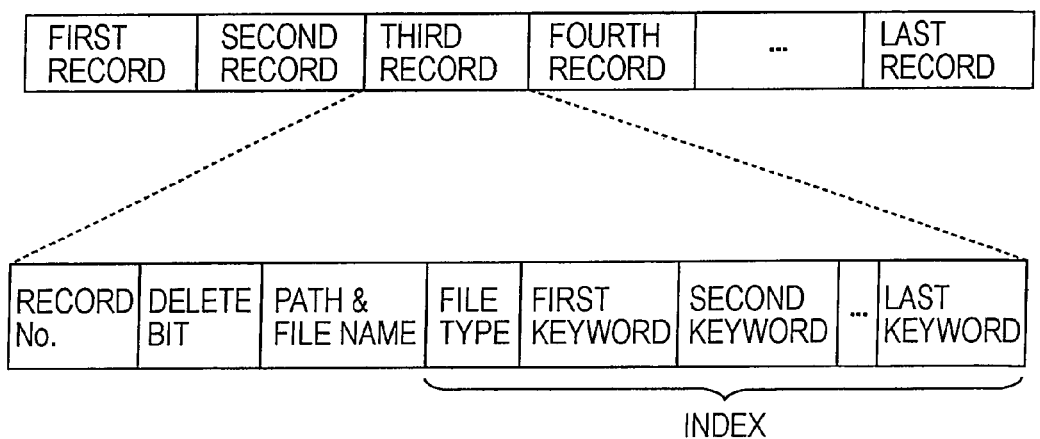
FIG. 3 is an explanatory diagram that illustrates one example of the contents of a record file.

The thus configured multimedia storage viewer 10 according to this exemplary embodiment has a record file creating function that creates index data containing information related to AV files stored in the hard disk 20a. FIG. 3 shows one example of the record file that contains index data created by the main controller 12. The record file is, for example, a binary file and has a structure that records one-to-one corresponding to the associated AV files stored in the hard disk 20a are arranged in a sequential manner like a first record, a second record, etc. Each record contains information related to the corresponding AV file and, for example, contains information such as a record number, a delete bit, a path and a file name, and a type of AV file and keywords as an index. A type of keywords depends upon a type of the AV file. For example, for an image file, a first keyword is a model name of an image input device, a second keyword is date and time of image data generation, a third keyword is a file type of an image, and a fourth keyword is the number of pixels. For a music file, a first keyword is a song title, a second keyword is an album name, a third keyword is an artist name, and a fourth keyword is a genre. Information corresponding to these keywords and types of AV files are read from the header information of the AV files when a record file creating routine, which will be described later, is executed, and then stored to be used for searching. Note that, with regard to the path and name of an AV file, when the AV file is added to the hard disk 20a by the main controller 12, a new record is added behind a last record in the record file, and the path and name of the AV file are then stored in the appropriate position within that record.

Figure 4:
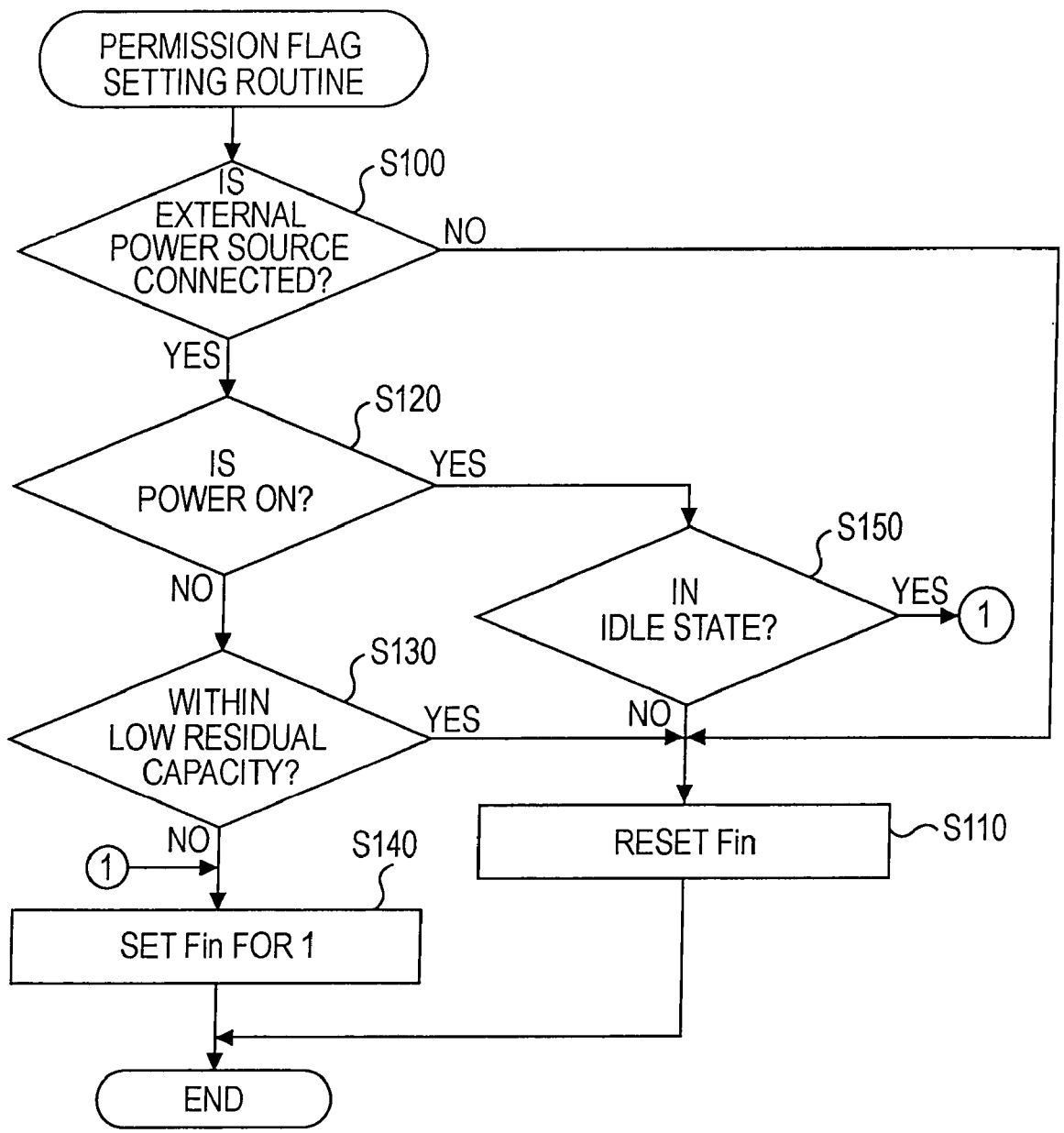
FIG. 4 is a flow chart that shows one example of a permission flag setting routine that is executed by a power controller of the multimedia storage viewer.

The operation of the multimedia storage viewer 10 will now be described. FIG. 4 is a flow chart that shows one example of the permission flag setting routine that is executed by the power controller 26. The permission flag setting routine is repeatedly executed at a predetermined interval (for example, every several milliseconds). When the permission flag setting routine is executed, the power controller 26 first determines whether or not electric energy is supplied from the external power source 30 (step S100). When it is determined that electric energy is not supplied from the external power source 30 (for example, when a user is carrying the multimedia storage viewer 10 with him or her), the main controller 12 executes a process to create index data and resets a permission flag Fin for '0' so as not to reduce a residual capacity of the battery 34 (step S110), thus ending the routine. When it is determined that electric energy is supplied from the external power source 30 in step S100 (for example, when a charger is connected to the multimedia storage viewer 10), the power controller 26 determines whether or not the multimedia storage viewer 10 is turned on (step S120). When the multimedia storage viewer 10 is not turned on, the power controller 26 determines whether or not the battery 34 has a residual capacity within a predetermined low residual capacity range (step S130). In this exemplary embodiment, the predetermined low residual capacity range is set to a range that has an upper limit residual capacity (a ratio of residual energy to a full capacity) on which the multimedia storage viewer 10 may be used in full operation only for a predetermined time (for example, five minutes). When it is determined that the residual capacity of the battery 34 is within the low residual capacity range in step S130, the power controller 26 resets the permission flag Fin for '0' to give priority to charging the battery 34 over creating a record file (step S110), thus ending the routine. On the other hand, when it is determined that the residual capacity of the battery 34 exceeds the low residual capacity range in step S130, the power controller 26 sets the permission flag Fin for '1' to give priority to charging the battery 34 over creating a record file (step S140), thus ending the routine. In this manner, because, when electric energy is supplied from the external power source 30 and the power switch 70 is off, a user-mostly allows the multimedia storage viewer 10 to acquire electric energy input from the external power source 30 in order to charge the battery 34, the multimedia storage viewer 10 is configured to give priority to charging the battery 34 over creating a record file when the battery 34 has a residual capacity within the low residual capacity range. When the power switch 70 is on in step S120, the power controller 26 determines whether or not the multimedia storage viewer 10 is in an idle state, that is, the main controller 12, or the like, is not executing a process in accordance with user's instructions (step S150). When the multimedia storage viewer 10 is not in an idle state, it means that the main controller 12, or the like, is executing a process and, therefore, the power controller 26 resets the permission flag Fin for '0' so as not to impede the executing process by creating a record file (step S110), thus ending the routine. On the other hand, when the multimedia storage viewer 10 is in an idle state in step S150, the power controller 26 sets the permission flag Fin for '1' in order to permit creating a record file (step S140), thus ending the routine.

Figure 5:
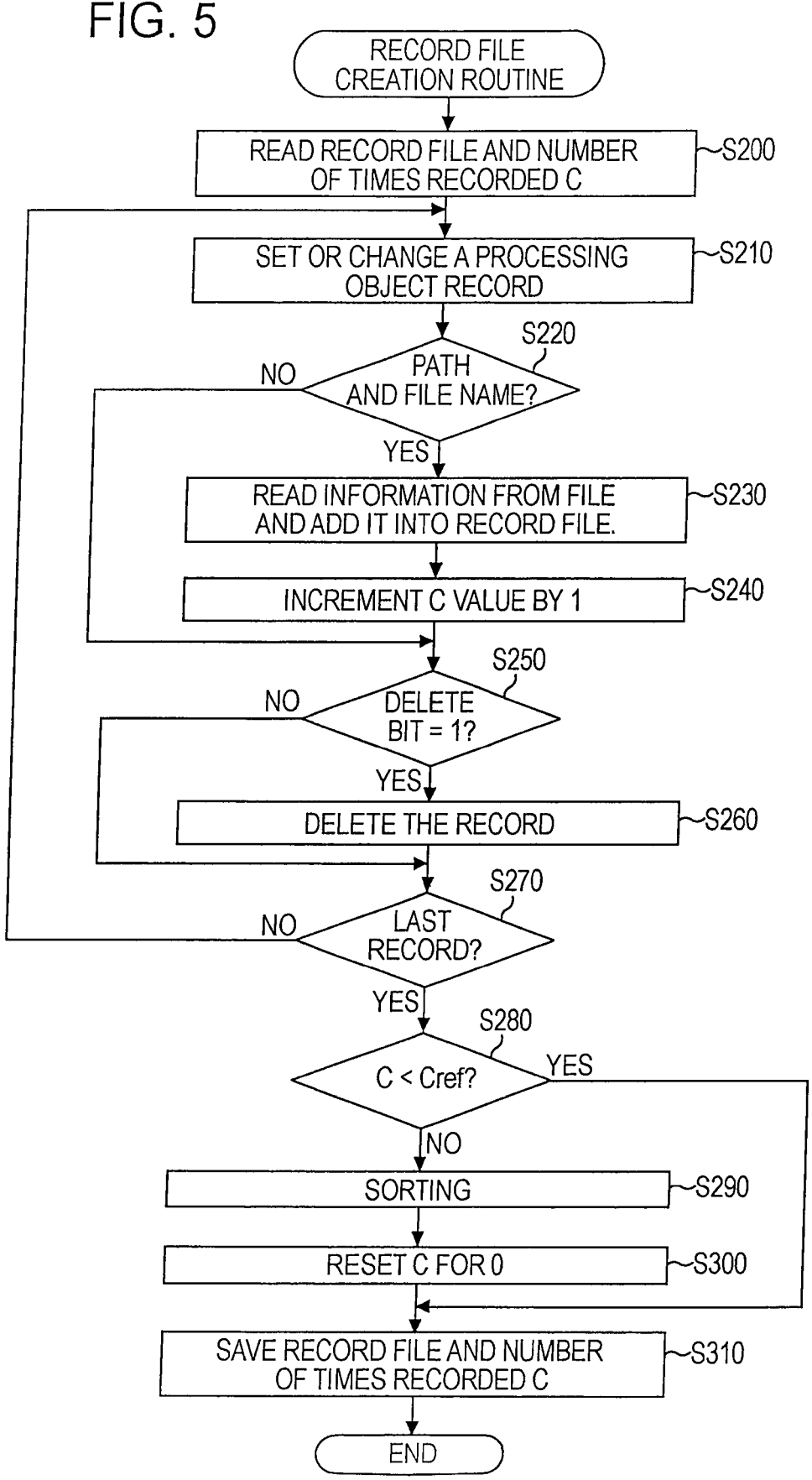
FIG. 5 is a flow chart that shows one example of a record file creation routine that is executed by a CPU of a main controller of the multimedia storage viewer.

The record file creation routine that is executed by the CPU 14 of the main controller 12 will now be described. FIG. 5 is a flow chart that shows one example of the record file creation routine. The record file creation routine is executed when the permission flag Fin is changed from '0' to '1'. Note that, because this routine is executed by the CPU 14 of the main controller 12 and utilizes the ROM 16, the RAM 18, the hard disk drive 20, and the like, when the CPU 14, the ROM 16, the RAM 18, the hard disk drive 20 are not supplied with electric energy when the permission flag Fin is changed from '0' to '1', the power controller 26 controls the power circuit 28 so as to supply the CPU 14, the ROM 16, the RAM 18, the hard disk drive 20 with electric energy, and the CPU 14 of the main controller 12 executes the routine after the supply of electric energy to the CPU 14 of the main controller 12, the ROM 16, the RAM 18, the hard disk drive 20, and the like, has been started. When the routine is started, the CPU 14 of the main controller 12 first reads a record file and the number of times recorded, which will be described later, from the hard disk 20a through the hard disk drive 20 and temporarily stores them in the RAM 18 (step S200).

After reading the record file in step S200, the CPU 14 sets a record to be processed for a first record (step S210). Then, the CPU 14 reads the information of the processed record, and determines whether or not the read information contains the path and name of the AV file only (step S220). When it is determined that the read information contains the path and name of the AV file only, the CPU 14 identifies a type of the AV file through the header information of the AV file stored in the path, reads the information corresponding to the type of the AV file, and then stores the read information at a predetermined position in the first record (step S230). Thereafter, the CPU 14 increments the number of times recorded C by one (step 240) and then proceeds to step S250. When it is determined that the read information contains other data in addition to the path and name of the AV file in step S220, the CPU 14 determines that the information corresponding to the type of the AV file has been already read from the AV file stored in the path and then proceeds to step S250. Next, the CPU 14 determines whether or not the delete bit is '1' (step S250). When the delete bit is '1', the CPU 14 deletes the path, file name, and index data contained in the current record (see FIG. 3) (step S260) and then proceeds to step S270. Here, the initial value of the delete bit of a record is '0'. When the AV file stored in the hard disk 20a and corresponding to the record is deleted, the delete bit is set for '1'. After the path, file name and index data contained in the record have been deleted, the delete bit is reset for '0'. In addition, when the path, file name and index data contained in the record are deleted, the record becomes a blank record with no information. When it is determined that the delete bit is not '1' in step S250, the CPU 14 determines that the current record must not be deleted and then proceeds to step S270.

When the processes in steps S210 to S260, such as acquisition of information from the AV file and deletion of information in the record when the delete bit is '1' have been completed, the CPU 14 determines whether or not the current record is the last record (step S270). Regarding whether or not the record is the last record, for example, the record may be determined as the last record when EOF (end of file) characters that indicate the end of the record file are detected right behind that record. When the record is not the last record, the CPU 14 proceeds to step S210 and sets a record to be processed for the next record (step S210). Then, the CPU 14 executes steps S220 to S270 as in the case of the process for the previous record, and, when the record is not the last record, proceeds again to step S210 and sets a record to be processed for the next record. In this manner, the CPU 14 sequentially processes records one by one and repeatedly executes processing the records from step S210 to S270. When the process reaches the last record, affirmative determination is made in step S270 and the process proceeds to the step S280.

After it has been determined that the process reaches the last record in step S270, in step S280, the CPU 14 determines whether or not the number of times recorded C is below a threshold value Cref that has been set in advance. When it is determined that the number of times recorded C is equal to or larger than the threshold value Cref, the CPU 14 executes sorting of the records to organize the order of records (step S290) and, after setting the number of times recorded C is reset for '0' (step S300), saves the record file and the number of times recorded C (step S310), thus ending the routine. Here, the number of times recorded C is a reference value used for determining whether or not records in the record file are organized regularly. The threshold value Cref of the number of times recorded C is used for determining whether or not the order of records in the record file is disorganized to such an extent as to require sorting. The relationship between the number of times recorded and the time required for searching of the record file is found in advance through an experiment, or the like, and the threshold value Cref is then determined based on the experimental results. When the number of times recorded C is below the threshold value Cref in step S280, it is determined that the order of the records in the record file is not disorganized to such an extent as to require sorting and the CPU 14 saves the record file and the number of times recorded C (step S310), thus ending the routine.

Sorting of records executed in step S290 will now be described. Sorting of records in the record file is mainly directed to reduce search time for searching the record file. In this exemplary embodiment, the records are sorted into the order of records corresponding to image files, records corresponding to moving image files, and records corresponding to music files. In this manner, by sorting records corresponding to AV files of the same type so as to be collected sequentially and storing the first record number of records corresponding to the AV files of each type and the number of records corresponding to the AV files of each type in the header information of the record file, when the index data are first searched by specifying the type of AV file, it is only necessary to search records that store the records corresponding to the AV files of a specified type by reading these information from the header information. This can remove searching of the index data corresponding to AV files of other types, thus making it possible to reduce the search time.

Here, the correspondence between the components of the exemplary embodiment and the components of the invention is made clear. The hard disk 20a of the exemplary embodiment corresponds to a file storage portion according to the invention. The hard disk drive 20 of the exemplary embodiment corresponds to a file reading portion according to the invention. The main controller 12 of the exemplary embodiment corresponds to an index creating portion according to the invention. The battery 34 of the exemplary embodiment corresponds to an electric storage portion according to the invention. The power circuit 28 and electric charge/discharge control circuit 32 of the exemplary embodiment correspond to an electric energy input/output portion according to the invention. The power controller 26 of the exemplary embodiment corresponds to an index creation determining portion according to the invention. In this exemplary embodiment, one example of a method of controlling a mobile device with an index creation function according to the invention may be apparent from the description of operation of the multimedia storage viewer 10.

According to the above-described multimedia storage viewer 10 of this exemplary embodiment, when electric energy can be input from the external power source 30, index data may be created utilizing electric energy supplied from the external power source 30 without utilizing electric energy stored in the battery 34. This makes it possible to create index data with no decrease in operable time of the battery 34. In addition, when electric energy can be input from the external power source 30 and the power switch 70 is off, a user mostly allows the multimedia storage viewer 10 to acquire electric energy input from the external power source 30 in order to charge the battery 34, it is possible to meet the user needs by giving priority to charging the battery 34 over creating index data when the residual capacity of the battery 34 is within the low residual capacity range. Furthermore, when electric energy can be input from the external power source 30 and the power switch 70 is on, and when the multimedia storage viewer 10 is not in an idle state, it means that a user is manipulating the multimedia storage viewer 10. The manipulation of the user is not impeded, as the creation of index data is not permitted. Yet further, even when sorting of records has been executed so as to sequentially store records having the same AV file type contained in the index data, when the number of times recorded C after the sorting is equal to or more than the threshold value Cref, it means that the order of the records may be disorganized and, therefore, sorting is executed again to regularly correct the order of records, thus making it possible to smoothly search the index data.

Note that the invention is not limited to the exemplary embodiment described above, but it may be modified into various forms without departing from the scope of the invention.

For example, in the above exemplary embodiment, the multimedia storage viewer 10 has an index creation function. However, the multimedia storage viewer 10 may have both an index creation function and an index search function. When the search results are displayed upon searching of index data, the type of AV file that needs to be displayed or played is first selected from the types of AV files that are displayed on the LCD panel 24 by manipulating the selection button 62 shown in FIG. 2 so as to move the cursor around, and then it is determined by pressing the OK button 60. Thereafter, a list of keywords corresponding to the selected type of AV file is displayed on the LCD panel 24. Here, when the keyword for searching is selected by manipulating the selection button 62 and the OK button is pressed, index search is executed using the selected keyword, and the search results are then displayed on the LCD panel 24. At this time, because records not corresponding to the AV files of the selected type are not searched, the search time may be reduced. Alternatively, in a state where a keyword input screen with a software keyboard is displayed, a keyword is selected and input with the selection button 62 and the OK button 60, and then the OK button 60 that doubles as a search start button is pressed to execute index search by the input keyword. Thereafter, the search results are displayed on the LCD panel 24. By doing so, not only creating index data but also searching the index data by the keyword is executed, and the results may be output. Note that the records with which the delete bit is '1' may be excluded from the search target.

In the above-described exemplary embodiment, the CPU 14 determines whether or not the information contains the path and name of the AV file only in step S220, and when it is determined that the information contains other data in addition to the path and name of the AV file, the CPU 14 does not execute the process in step S230 for reading information from the AV file, and proceeds to step S250. However, even when the information contains other data in addition to the path and name of the AV file, the process in step S230 may be executed so as to update index data.

In the above-described exemplary embodiment, a memory card having no controller installed therein may be connected to the multimedia storage viewer 10. However, any memory card of a type having a recordable storage area for image files, moving image files, music files, or the like, is applicable. For example, it is applicable that a memory card has a controller installed therein.

In the above-described exemplary embodiment, AV files and the number of times recorded C are stored on the hard disk 20a of the hard disk drive. However, any storage medium that stores AV files and the number of times recorded C is applicable. For example, a portable storage medium such as a CD-R, a DVD-RAM, a flexible disk, and a non-portable storage medium such as an RAM, an EEPROM (not shown) installed inside the multimedia storage viewer 10, or the like, are applicable. When a storage medium other than the hard disk 20a is used as a storage that stores AV files and the number of times recorded C, the multimedia storage viewer 10 may be provided with a port that allows the storage medium in use to be detachable and an interface that governs the connection between the port and the storage medium in use.

In the above-described exemplary embodiment, the memory card is connected and AV files are input from the storage area of the memory card. However, as far as AV files are allowed to be input, they may be input not from a memory card but from, for example, an imaging device such as a CCD.

In the above-described exemplary embodiment, records are created for image files, moving image files, and music files. However, files for which records are created may be any file type as far as it can be searched by a search key. For example, it may be a text file. When the index search is executed for text files, text files as well as index data may be searched.

In the above-described exemplary embodiment, sorting of records is performed by executing the sorting process routine shown in FIG. 6. However, as far as sorting of records is performed so as to create groups having common specific contents contained in the index data, any sorting method is applicable.

In the above-described exemplary embodiment, the record file creation routine shown in FIG. 6 starts when the permission flag Fin is changed from '0' to '1' and continues until the end. However, the record file creation routine may be interrupted when the permission flag becomes '0' during the routine.

In the above-described exemplary embodiment, a record containing the path and name of an AV file only is added to the record file when the AV file is stored in the hard disk 20a of the hard disk drive 20. However, the process that adds information of an AV file stored in the hard disk 20a to the record file may be executed any time. For example, when the record file is created, AV files having no corresponding records in the index file may be searched from the hard disk 20a and then added to the record file.

In the above-described exemplary embodiment, the multimedia storage viewer 10 serves as a USB host to which the USB device 40 may be connected. However, the multimedia storage viewer 10 may serve as a USB device. In this case, when the multimedia storage viewer 10 is connected to a PC, or the like, having a USB host controller, it is possible for the PC to read files stored in the hard disk 20a, and it is possible to write files into the hard disk 20a. In addition, when electric energy can be input from a PC, or the like, having a USB host controller through the VBUS terminal of a USB connector, electric energy may be input through the VBUS terminal to be able to charge the battery 34, or the value of permission flag may be set depending on the presence or absence of electric energy input from the VBUS terminal. For example, in step S100 of the permission flag setting routine, when no electric energy is input from the external power source 30 and the VBUS terminal, negative determination may be made to proceed to step S110, on the other hand, when electric energy is input from at least one of the external power source 30 and the VBUS terminal, affirmative determination may be made to proceed to step S120.

In the above-described exemplary embodiment, the invention is applied to the multimedia storage viewer 10 with a record file creation function for creating index data. However, the invention is applicable to any mobile device that has some sort of index creation function and can operates on an electric storage device such as a battery.

What is claimed is:

1. A mobile device with an index creation function, comprising:
   a file storage portion that stores files;
   a file reading portion capable of reading the contents of the files stored in the file storage portion;
   an index creating portion that controls the file reading portion so as to read the contents of the files stored in the file storage portion and that creates index data that can be used for searching of the contents of the files read by the file reading portion;
   an electric storage portion capable of being charged/discharged;
   an electric energy input/output portion capable of acquiring electric energy input from the electric storage portion and an external power source, and capable of outputting electric energy to the electric storage portion, the file reading portion, and the index creating portion; and
   an index creation determining portion that permits the index creating portion to create the index data when an index creation condition that the electric energy input/output portion can acquire electric energy input from the external power source is satisfied, and that does not permit the index creating portion to create the index data when the index creation condition is not satisfied.

2. The mobile device with an index creation function according to claim 1, further comprising:
   a keyword input portion with which a keyword is input;
   an index search portion that searches the index data created by the index creating portion on the basis of the keyword input by the keyword input portion; and
   a search result output portion that outputs the results of searching executed by the index search portion.

3. The mobile device with an index creation function according to claim 1, wherein the index creating portion is configured to sort the index data so as to create groups, each having common specific contents contained in the index data, with an increase in the number of index data by a predetermined number.

4. The mobile device with an index creation function according to claim 1, wherein the index creation determining portion is configured, in the case where the electric energy input/output portion can acquire electric energy input from the external power source, to permit the index creating portion to create the index data when a power switch is off and the electric storage portion has a residual capacity outside a predetermined low residual capacity range, and not to permit the index creating portion to create the index data when the power switch is off and the electric storage portion has a residual capacity within the predetermined low residual capacity range.

5. The mobile device with an index creation function according to claim 1, wherein the index creation determining portion is configured, in the case where the electric energy input/output portion can acquire electric energy input from the external power source, to permit the index creating portion to create the index data when the power switch is on and the mobile device is in an idle state, and not to permit the index creating portion to create the index data when the power switch is on and the mobile device is not in an idle state.

6. The mobile device with an index creation function according to claim 1, wherein the file storage portion is a hard disk, and the file reading portion is a hard disk drive.

7. A method of controlling a mobile device with an index creation function including a file storage portion that stores files, a file reading portion capable of reading the contents of the files stored in the file storage portion, an index creating portion that controls the file reading portion so as to read the contents of the files stored in the file storage portion and creates index data that can be used for searching of the contents of the files read by the file reading portion, an electric storage portion capable of being charged/discharged, and an electric energy input/output portion capable of acquiring electric energy input from the electric storage portion and an external power source, and is capable of outputting electric energy to the electric storage portion, the file reading portion, and the index creating portion, the method comprising:
 permitting the index creating portion to create the index data when an index creation condition that the electric energy input/output portion can acquire electric energy input from the external power source is satisfied; and
 not permitting the index creating portion to create the index data when the index creation condition is not satisfied.

8. A computer readable storage medium storing a computer program, executable on one or plurality of computers, for implementing a method of controlling a mobile device with an index creation function including a file storage portion that stores files, a file reading portion capable of reading the contents of the files stored in the file storage portion, an index creating portion that controls the file reading portion so as to read the contents of the files stored in the file storage portion and creates index data that can be used for searching of the contents of the files read by the file reading portion, an electric storage portion capable of being charged/discharged, and an electric energy input/output portion capable of acquiring electric energy input from the electric storage portion and an external power source, and is capable of outputting electric energy to the electric storage portion, the file reading portion, and the index creating portion, the computer program comprising instructions for:
 permitting the index creating portion to create the index data when an index creation condition that the electric energy input/output portion can acquire electric energy input from the external power source is satisfied; and
 not permitting the index creating portion to create the index data when the index creation condition is not satisfied.

* * * * *